United States Patent [19]

Dechert

[11] 4,163,673
[45] Aug. 7, 1979

[54] FURNITURE POLISH EMULSION

[75] Inventor: Roberta S. Dechert, Mequon, Wis.

[73] Assignee: S. C. Johnson & Son, Inc., Racine, Wis.

[21] Appl. No.: 830,935

[22] Filed: Sep. 6, 1977

[51] Int. Cl.$^2$ .................... C09G 1/04; C09G 1/08; C09G 1/10; C09G 1/12

[52] U.S. Cl. ................................ 106/11; 106/10; 106/270; 106/271; 106/285; 260/28.5 C; 260/29.6 XA; 260/29.7 GP

[58] Field of Search ................ 106/11, 10, 270, 271, 106/285

[56] References Cited

U.S. PATENT DOCUMENTS

| | | | |
|---|---|---|---|
| 2,584,413 | 2/1952 | Baer et al. .................... | 106/11 |
| 2,907,664 | 10/1959 | Schoenholz et al. ........... | 106/11 X |
| 3,395,028 | 7/1968 | Mackles ....................... | 106/11 X |
| 3,508,933 | 4/1970 | Yates ........................... | 106/11 X |
| 3,544,498 | 12/1970 | Holdstock et al. ............ | 106/11 X |
| 3,551,168 | 12/1970 | Atherton et al. .............. | 106/11 X |
| 3,576,779 | 4/1971 | Holdstock et al. ............ | 106/11 X |
| 3,658,718 | 4/1972 | Clumpner ..................... | 106/11 X |
| 3,847,622 | 11/1974 | Brandl et al. ................. | 106/10 |
| 4,013,475 | 3/1977 | Liebowitz et al. ............ | 106/11 X |

Primary Examiner—Carman J. Seccuro

[57] ABSTRACT

A water-in-oil emulsion for treating of furniture surfaces, providing both superior gloss properties and superior cleaning of oil-borne deposits. The emulsion has silicone fluids and, in some cases, other film formers such as wax, resin, and/or non-drying oils, a suitable hydrocarbon solvent, water, and is characterized by an emulsifier system having from about 0.05 to 3% (by weight of the entire composition, excluding any propellant) of a cationic emulsifier which (1) is soluble in the hydrocarbon solvent, (2) is insoluble but dispersible in water, and (3) has an HLB value of less than about 10, and from 0 to about 5% of a nonionic emulsifier at least in an amount sufficient to stabilize the emulsion.

16 Claims, No Drawings

FURNITURE POLISH EMULSION

FIELD OF THE INVENTION

This invention relates to novel surface treating compositions for household surfaces such as furniture. More specifically, this invention relates to surface cleaning and polishing compositions comprising water-in-oil emulsions.

DESCRIPTION OF THE PRIOR ART

It has heretofore been generally known to employ various compositions for the cleaning and polishing of hard household surfaces such as furniture. Such compositions have been prepared and used in various forms, including pastes, solutions, lotions, creams and as emulsions. Emulsions have been one of the most popular and convenient forms in recent years, particularly emulsions sprayed from self-pressurized containers.

In the field of furniture polish emulsions, water-in-oil emulsions have been preferred for their acceptable cleaning of oil-borne deposits, together with their good application properties and physical appearance attributes (gloss). Water-in-oil emulsions of the prior art, including several well known commercial products, typically have a silicone fluid and/or non-drying oils and/or minor amounts of wax or resin as film formers, isoparaffinic hydrocarbon solvents and water, both of which function as cleaners, a liquid propellant (in pressurized products), and minor amounts of emulsifiers, preservatives, perfumes, and, in some cases, other minor constituents. Substantial adjustments may be made in the identities and relative proportions of these constituents to achieve particular objectives in the area of product performance.

It is well known that two major objectives, specifically (1) the improved cleaning of oil-borne stains on furniture, and (2) the deposition of a superior glossy film, are diametrically opposed. Within predetermined cost constraints, for example, the maintenance of superior gloss properties has necessitated some degree of sacrifice in the cleaning of oil-borne deposits. On the other hand, improvement in the cleaning of oil-borne deposits has necessitated an increase in the strength and/or amount of hydrocarbon solvents used, which tends to reduce the effectiveness of the film formers in producing a substantial, even, glossy film. Under conventional technology, the superior gloss properties could only be regained by upwardly adjusting the nonvolatile content (the film formers) of a formulation until the proper gloss level was achieved. Such compensating adjustments, of course, substantially increase product costs.

Increasing the solvent level (e.g., from 30% to 40%) to provide better cleaning of oil-borne deposits not only has a deleterious effect on the film forming characteristics of the emulsion, but, since it decreases the amount of the internal phase of the emulsion, alters its creamy physical appearance, its viscosity, and its flammability characteristics, all of which are viewed as positive attributes of water-in-oil furniture polish emulsions having a lower level of hydrocarbon solvent.

It was known that because of their substantive properties cationic emulsifiers could be used to enhance the film deposition of a furniture polish emulsion. However, cationic emulsifiers tend to promote oil-in-water emulsions and are known to detract from or destroy the physical stability of water-in-oil emulsions. And, if large amounts of water-in-oil nonionic emulsifiers are used with conventional cationic emulsifiers to maintain stability, the preponderance of emulsifiers tends to counteract the film deposition benefits of the cationic member.

Thus, there has been a need well recognized in the art to develop a water-in-oil emulsion furniture polish which exhibits both a very high level of gloss and a high capability to clean oil-borne stains and deposits on furniture surfaces, without making sacrifices in the areas of product viscosity, physical appearance and flammability characteristics, and particularly without incurring substantial increases in raw material costs.

OBJECTS OF THE INVENTION

It is, therefore, an object of the present invention to provide a novel surface-treating composition for household surfaces such as furniture.

Another object of this invention is to provide a novel water-in-oil emulsion which provides superior cleaning of oil-borne deposits on furniture surfaces without sacrificing in the deposition of a glossy protective film.

Another object of this invention is to provide the aforementioned advantages without exaggerated increases in the strength and/or level of solvent and film forming constituents.

Yet another object of this invention is to provide a water-in-oil furniture polish emulsion with the aforementioned advantages without substantial increases in raw material costs.

Still another object of this invention is to provide a novel water-in-oil emulsion having the aforementioned advantages without sacrificing certain favorable characteristics of some commercially popular products, such as a creamy physical appearance, low flammability characteristics, and viscosity characteristics deemed favorable for dispensing and which provide ease of application.

Other objects of the present invention will be set forth in, or be apparent from, the following detailed description of the invention.

SUMMARY OF THE INVENTION

The water-in-oil furniture polish emulsion of this invention has organic polysiloxane as a surface-coating agent, and, in some cases, other surface-coating agents such as wax, resin, and/or non-drying oils, a suitable hydrocarbon solvent, water, and is characterized by an emulsifier system having from about 0.05 to 3% (by weight of the entire composition, excluding any propellent) of a cationic emulsifier which (1) is soluble in the hydrocarbon solvent, (2) insoluble but dispersible in water, and (3) has an HLB value of about less than about 10, and, from 0 to about 5% of a nonionic emulsifier at least in an amount sufficient to stabilize the emulsion.

This water-in-oil emulsion may be used in pressurized form with the addition of an appropriate amount of liquid or gaseous propellant, or with other pressurizing means, or it may be used as a cream or dispensed by a mechanical pump or other means. The pressurized form is preferred.

The water-in-oil emulsion furniture polish of this invention solves the aforementioned problems by providing a low cost emulsion polish having both superior cleaning of oil-borne deposits and superior film forming characteristics. Additionally, the emulsion system forming a part of this invention allows a reduction in total emulsifier content compared to certain well known commercial water-in-oil furniture polish emulsions of the prior art. And, even at reduced emulsifier levels, the emulsifier system enhances film deposition. The formulations of this invention exhibit excellent emulsion stability over long periods of time.

The water-in-oil furniture polish emulsion of this invention exhibits an increase in the wipeout time relative to analogous water-in-oil emulsions of the prior art, which utilize standard emulsifier systems. An unexpected benefit, however, considered anomalous under conventional furniture polish principles, is that the increased wipeout time does not lead to a decrease in gloss as might normally be expected. And, the film formers are not only efficiently deposited but several additional benefits are provided. The longer wipeout period apparently allows the solvent to remain on the surface performing the cleaning function for a longer period of time. Thus, superior cleaning of oil-borne deposits is provided with far less than the usual increase in solvent level for that intended purpose. A longer wipeout period also allows a more even spreading of the film, thus rendering the formulations of this invention less prone to streaking, smearing and the like. In addition, the water-in-oil emulsions of this invention have demonstrated less mottling in the residual film than analogous emulsion systems of the prior art, which use standard nonionic emulsifiers.

The emulsifier system of the water-in-oil furniture polish emulsion of this invention has a cationic emulsifier which is soluble in the hydrocarbon solvent used but insoluble and dispersible in water and has an HLB (hydrophile-lypophile balance) of less than about 10. Such cationic emulsifiers are included in the compositions of this invention in amounts of from about 0.05 to 3% by weight of the total composition (excluding any propellant). When less than about 0.5% of the cationic emulsifier is used, the inclusion of a nonionic emulsifier is typically required to provide emulsion stability. When about 0.5% or more of the cationic emulsifier is used, the inclusion of a nonionic emulsifier is not typically essential to provide satisfactory stability characteristics in the emulsion; however, some nonionic emulsifier may be preferred in any case because of the improvement provided in emulsion stability.

As more nonionic emulsifier is utilized to provide greater emulsion stability, the beneficial effects of the cationic emulsifier on film deposition tend to become less apparent, particularly if the nonionic emulsifier is strongly lypophilic, such as nonionics having HLB values less than about 4. However, with nonionic emulsifiers which are less strongly lypophilic, such as those having HLB values on the order of 7, as much as about 5% may be used without seriously interfering with the film deposition benefits of the cationic emulsifier, even if the cationic emulsifier is used at a level as low as about 0.05%. It will be apparent to those skilled in the art how to balance the emulsifier system to achieve both desired stability and improvement in film forming characteristics.

The cationic emulsifiers useful in this invention include: certain quaternary ammonium compounds such as the quaternary ammonium halides and quaternary ammonium sulfates; the ethoxylated fatty amines which are ethoxylated with from 2 to 10 moles of ethylene oxide; and chloride or acetate salts of amines or ethoxylated amines which are ethoxylated with two moles of ethylene oxide. Certain quaternary ammonium halides, particularly certain quaternary ammonium chlorides, are highly preferred. To be useful in this invention, however, the specific cationic emulsifiers to be used, including those chosen from the above groups, must be insoluble but dispersible in water, and soluble in the hydrocarbon solvent which is used in the composition.

The most preferred cationic emulsifier is a long chain difatty ethoxylated quaternized amidoamine of the formula

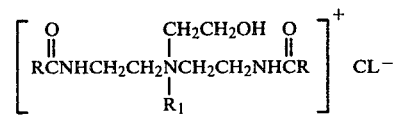

where R is a fatty residue derived from soya oil and $R_1$ is methyl. This preferred cationic emulsifier is derived from reacting soya oil and diethylenetriamine, the product being further reacted with ethylene and/or propylene oxide to form a tertiary amine which is then quaternized by methyl chloride.

The cationic emulsifier used in an embodiment of this invention may be a single emulsifier compound or a blend of emulsifier compounds which together satisfy the characteristics described above.

The cationic emulsifier is used in an amount of from about 0.5 to 3% by weight of the entire composition (excluding any propellant). If the amount of cationic emulsifier is increased, the efficiency of film deposition is improved and emulsion stability improves. However, if the amount of cationic emulsifier is increased beyond a certain point, the quality of the film may be negatively affected. A preferred range of the amount of catonic emulsifier used in compositions of this invention is about from 0.07 to 0.5%.

Examples of suitable nonionic emulsifiers used in certain embodiments of this invention include sorbitan monoesters of oleic, stearic, palmitic or lauric acids, and mono- and diglycerides of fat-forming fatty acids. Examples of more strongly lypophylic nonionic emulsifiers are the mono- and diglycerides of fat-forming fatty acids. An example of a weaker nonionic emulsifier is sorbitan monolaurate, while sorbitan monostearate and sorbitan monopalmitate are generally considered midrange emulsifiers.

As previously mentioned, the use of such nonionic emulsifiers is optional depending on the amount of cationic emulsifier used in compositions of this invention. When less than about 0.5% of a cationic is used, a nonionic emulsifier may be included to provide the desired stability. In such cases, about 0.01 to 5% of the nonionic emulsifier is an acceptable amount.

Silicones which may be employed in the practice of this invention are organic polysiloxanes including polydialkyl siloxanes and polyalkyl aryl siloxanes. Polysiloxanes such as dimethyl polysiloxane, diethyl polysiloxane, methyl ethyl polysiloxane, methyl phenyl polysiloxane, and copolymers of two or more of such siloxanes are exemplary of the materials which can be used. Dimethyl polysiloxane is especially preferred. Polysiloxanes having viscosities in the range of about 5 to 50,000 centistokes can be employed, with viscosities of the order of 100 to 1,000 centistokes being preferred. The total quantity of silicones utilized in the compositions should be about 0.1 to 10% by weight of the total composition (excluding any propellant) with a preferred range of from 1-6% and a most preferred range of 2-4%.

In addition to the organic polysiloxane, from 0 to about 5% of another surface-coating agent selected from the group consisting of wax and resin and combinations of wax and resin is included in the composition of this invention. In some embodiments, no wax or resin is necessary to obtain a suitable gloss. The organic polysiloxane fluid may be the sole film former used; however, it should be understood that such a formulation is not advisable because the residual gloss after a short period of time may be uneven and appear mottled. It is highly preferred to use minor amounts of wax and/or resins as film formers in addition to the organic polysiloxane.

The waxes which may be used in the present invention are any predominantly hydrocarbon aliphatic materials of high molecular weight, including natural and synthetic waxes, ester-type waxes such as candelilla and carnauba wax and the synthetic ester-type waxes, microcrystalline wax and petroleum wax. A wide variety of other waxes are also quite acceptable. Resinous materials suitable for use in the compositions of this invention include polyethylene and polypropylene resins and others well known to those skilled in the art. A preferred range for such waxes and/or resins is about 0.1 to 2.5% with the most preferred range on the order of 1.0 to 2.0%. Typically, resins are used in relatively minor amounts, and waxes are used in somewhat greater amounts.

In addition to the silicone fluids, waxes and resins mentioned above, non-drying oils may be used to enhance the film forming characterstics of compositions of this invention. Examples of suitable non-drying oils include the heavy and light mineral oils. While certain preferred embodiments do not contain any non-drying oil, as much as 20% may be used. Lower amounts are preferred to avoid greasiness on the polished surface. The viscosity of such mineral oils is preferably within the range of 50 to 250 SSU. Suitable examples are the series of mineral oils sold by Exxon Company, U.S.A. under the trademarks MARCOL or PRIMOL.

Acceptable solvents include hydrocarbon solvents having kauri-butanol values of from about 20 to about 50, and having boiling ranges which lie within the range of 80 to 200° C., and preferably lying within the range of 95 to 150° C., all as is well known for solvents to be used in furniture polishes. Isoparaffinic hydrocarbon solvents are highly preferred because they are substantially odor-free. Suitable examples are those of the series of commercially available isoparaffinic hydrocarbon solvents sold by Exxon Comany, U.S.A. under the trademark ISOPAR or Phillips Petroleum under the trademark SOLTROL which have boiling ranges within the above ranges. The hydrocarbon solvent may be contained in compositions of this invention in an amount of about 10 to 70% by weight of the composition (excluding any propellants). A preferred range is 20 to 50% and a most preferred range is 25 to 35%. Compositions according to this invention display excellent cleaning of oil-borne deposits utilizing substantially less hydrocarbon solvents than conventional formulations designed to provide good oil-borne cleaning characteristics.

In addition to the aforementioned components of the compositions of this invention, minor amounts of preservatives, such as formaldehyde, and fragrances may be added. Suitable preservatives and fragrances are well known to those skilled in the art.

Standard techniques for forming water-in-oil furniture polish emulsions may be used to produce the water-in-oil emulsion compositions of this invention. One acceptable technique is to charge the film forming constituents, the emulsifiers and the solvent into a vessel and heat until the solids are melted and blended homogeneously in the vessel. Charge the water and minor amounts of the preservative gradually into the vessel with vigorous agitation. Cool the composition to approximately ambient temperatures. Homogenize the mixture using a Manton-Gaulin, or other similar homogenizer. If desired, a fragrance may be added by cold-blending with the polish intermediate.

The resulting composition may be packaged in bottles or cans or other containers at ambient pressure or may be pressure packaged in metal cans or a wide variety of other aerosol-type dispensers. Pressure packaging may be accomplished, for example, by charging aerosol cans using standard aerosol charging techniques and about 5 to 30 % of hydrocarbon liquid propellants or other liquid propellants with about 95-70% of the polish composition described herein. As an alternative, compressed gases, such as carbon dioxide and nitrous oxide, may be used for pressure packaging. A wide variety of other packaging techniques may also be used.

The following are examples of the water-in-oil emulsion furniture polish compositions of this invention. All examples are prepared using techniques substantially as described above.

EXAMPLE I

An emulsifier system, having as the cationic emulsifier 0.20% (by weight of the polish composition) of a long chain difatty ethoxylated quaternized amidoamine of the formula

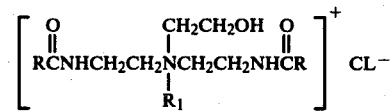

where R is a fatty residue derived from soya oil and $R_1$ is methyl, which is soluble in isoparaffinic hydrocarbon solvents having a boiling range within the range of 80°-200° C. and has an HLB value of about 8.5, and as a nonionic emulsifier 0.30% of mono- and diglycerides of fat-forming fatty acids, is used to emulsify the following additional polish components:

|  | % (by weight of the polish composition) |
|---|---|
| Dimethyl polysiloxane | 1.00 |
| Ester wax | 0.25 |
| Microcrystalline wax | 0.50 |
| Carnauba wax | 0.15 |
| Isopar E* | 25.00 |
| Formalin | 0.20 |
| Fragrance | 0.30 |
| Water | q.s. 100 |

*An isoparaffinic hydrocarbon solvent from Exxon Company, U.S.A. composed principally of $C_8$ isomers and having a boiling range of 11°-139° C.

The resulting water-in-oil furniture polish emulsion exhibits both excellent cleaning of oil-borne deposits and good gloss properties.

EXAMPLE II

An emulsifier system having 0.50% of the cationic emulsifier of Example I and 2.00% of a nonionic emulsifier which is sorbitan monolaurate is used to emulsify the following components:

|  | % |
|---|---|
| Dimethyl polysiloxane | 8.00 |
| Marcol 70* | 15.00 |
| Primol 185* | 5.00 |
| Isopar C** | 10.00 |
| Formalin | 0.20 |
| Fragrance | 0.30 |
| Water | q.s. 100 |

*A mineral oil from Exxon Company, U.S.A.
**An isoparaffinic hydrocarbon solvent from Exxon Company, U.S.A. having a boiling range of 98°–106° C.

The resulting water-in-oil furniture polish emulsion is an example of a wax-free composition having relatively high amounts of silicone oil and mineral oil together with a relatively low level of solvent. In spite of the low level of solvent, the composition exhibits good cleaning properties, primarily due to the emulsifier system.

EXAMPLE III

An emulsifier system having 0.30% of the cationic emulsifier of Example I and 2.00% sorbitan monostearate is used to emulsify the following components:

|  | % |
|---|---|
| Dimethyl polysiloxane | 6.50 |
| Microcrystalline wax | 4.00 |
| Paraffin wax (Melt point 56° C.) | 0.25 |
| Isopar C | 56.00 |
| Formalin | 0.20 |
| Fragrance | 0.30 |
| Water | q.s. 100 |

The resulting water-in-oil furniture polish, despite the high levels of wax, silicones and solvents, exhibits acceptable gloss properties as well as excellent cleaning of oil-borne deposits, primarily because of the substantivity of the emulsifier system.

EXAMPLE IV

An emulsifier system having 0.07% of the cationic emulsifier of Example I and 0.20% of mono- and diglycerides of fat-forming fatty acids is used to emulsify the following components:

|  | % |
|---|---|
| Dimethyl polysiloxane | 4.00 |
| Ester wax | 0.10 |
| Microcrystalline wax | 1.00 |
| Alpha-olefin wax (Melt point 70° C.) | 0.40 |
| Blend of Isopar solvents - 45% Isopar C with 55% Isopar E | 29.00 |
| Formalin | 0.20 |
| Fragrance | 0.30 |
| Water | q.s. 100 |

The resulting water-in-oil furniture polish emulsion exhibits excellent cleaning of oil-borne deposits and provides excellent gloss properties.

EXAMPLE V

An emulsifier system having 0.05% of the cationic emulsifier of Example I and 0.10% of mono- and dyglycerides of fat-forming fatty acids is used to emulsify the following components:

|  | % |
|---|---|
| Dimethyl polysiloxane | 5.00 |
| Ester wax | 0.10 |
| Microcrystalline wax | 0.20 |
| Paraffin wax (Melt point 56° C.) | 0.20 |
| Blend of ISOPAR solvents - 80% ISOPAR E with 20% ISOPAR G* | 15.00 |
| Formalin | 0.20 |
| Fragrance | 0.30 |
| Water | q.s. 100 |

* ISOPAR G is an isoparaffinic hydrocarbon solvent from Exxon Company, U.S.A. having a boiling range of 158°–174° C.

The resulting water-in-oil emulsion exhibits excellent cleaning properties and good residual gloss with minimal wax buildup.

EXAMPLE VI

The emulsifier system having 2.80% of the cationic emulsifier of Example I is used to emulsify the following components:

|  | % |
|---|---|
| Dimethyl polysiloxane | 3.50 |
| Microcrystalline wax | 0.60 |
| Carnauba wax | 0.15 |
| Paraffin wax (Melt point 56° C.) | 0.20 |
| Blend of ISOPAR solvents - 60% ISOPAR E with 40% ISOPAR C | 32.00 |
| Formalin | 0.20 |
| Fragrance | 0.30 |
| Water | q.s. 100 |

This is an example of a water-in-oil emulsion wherein the cationic emulsifier is the only emulsifier used. The resulting stable emulsion exhibits excellent cleaning of oil-borne deposits; indeed, it is believed that the emulsifier itself aids in the cleaning properties. The gloss deposited by this polish is quite acceptable.

EXAMPLE VII

An emulsifier system, having as the cationic emulsifier 0.20% of a quaternary ammonium sulfate of the formula

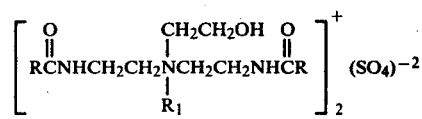

where R is a fatty residue derived from soya oil and $R_1$ is methyl and 1.00% sorbitan monooleate as a nonionic emulsifier, is used to emulsify the following components:

|  | % |
|---|---|
| Dimethyl polysiloxane | 3.00 |
| Microcrystalline wax | 0.50 |
| Coumarone-indene resin | 0.25 |

| | % |
|---|---|
| Blend of ISOPAR solvents - 75% ISOPAR C with 25% ISOPAR G | 30.00 |
| Formalin | 0.20 |
| Fragrance | 0.30 |
| Water | q.s. 100 |

The resulting water-in-oil furniture polish emulsion exhibits excellent cleaning of oil-borne deposits and durable gloss.

EXAMPLE VIII

An emulsifier system having 0.05% of the cationic emulsifier of Example I and 5.00% sorbitan monolaurate is used to emulsify the following components:

| | % |
|---|---|
| Dimethyl polysiloxane | 4.25 |
| Ester wax | 0.15 |
| Microcrystalline wax | 0.90 |
| Paraffin wax (Melt point 56° C.) | 0.15 |
| Alpha-olefin wax (Melt point 70° C.) | 0.30 |
| MARCOL 70 | 0.20 |
| ISOPAR E | 28.00 |
| Formalin | 0.20 |
| Fragrance | 0.30 |
| Water | q.s. 100 |

The resulting water-in-oil emulsion exhibits improved gloss when compared to analogous nonionic systems and shows particular improvement in the cleaning of oil-borne deposits.

EXAMPLE IX

An emulsifier system, having as the cationic emulsifier 0.15% ETHOMEEN S/12, an ethoxylated fatty amine of The Armak Company, Chicago, Ill., having an HLB value of about 6.4, and 0.50% sorbitan monooleate, is used to emulsiy the following components:

| | % |
|---|---|
| Dimethyl polysiloxane | 4.40 |
| Microcrystalline wax | 0.75 |
| Carnauba wax | 0.20 |
| Paraffin wax (Melt point 56° C.) | 0.25 |
| Blend of ISOPAR solvents - 70% ISOPAR E with 30% ISOPAR G | 28.00 |
| Formalin | 0.20 |
| Fragrance | 0.30 |
| Water | q.s. 100 |

The resulting water-in-oil emulsion provides an excellent gloss as well as excellent cleaning of oil-borne deposits.

EXAMPLE X

An emulsifier system having 0.10% ETHOMEEN S/12 and 0.40% sorbitan monooleate, is used to emulsify the following components:

| | % |
|---|---|
| Dimethyl polysiloxane | 0.10 |
| Microcrystalline wax | 0.25 |
| MARCOL 70 | 4.00 |
| PRIMOL 185 | 1.00 |
| ISOPAR C | 22.00 |
| Formalin | 0.20 |
| Fragrance | 0.30 |
| Water | q.s. 100 |

The resulting water-in-oil furniture polish emulsion exhibits good cleaning of oil-borne deposits and good film deposition.

EXAMPLE XI

An emulsifier system having 0.07% ETHOMEEN S/12 and 0.78% sorbitan monooleate is used to emulsify the following components:

| | % |
|---|---|
| Dimethyl polysiloxane | 3.50 |
| Microcrystalline wax | 0.70 |
| Paraffin wax (Melt point 56° C.) | 0.30 |
| ISOPAR E | 20.00 |
| Formalin | 0.20 |
| Fragrance | 0.30 |
| Water | q.s. 100 |

The resulting water-in-oil emulsion gives a good, dry, glossy film with excellent cleaning properties.

Any of the foregoing formulations may be packaged in a number of ways, some of which were mentioned above, for either pressurized or non-pressurized dispensing.

While in the foregoing specification, this invention has been described in relation to certain preferred embodiments and many details have been set forth for purpose of illustration, it will be apparent to those skilled in the art that the invention is susceptible to additional embodiments and that certain of the details described herein can be varied considerably without departing from the basic principles of the invention.

I claim:

1. A surface-treating composition for furniture comprising a water-in-oil emulsion having:
   from about 0.1–10% (by weight of the composition excluding any propellants) of a film-forming organic polysiloxane;
   from 0 to about 5% of a surface-coating agent selected from the group consisting of film-forming wax and film-forming resin and combinations thereof;
   from 0 to about 20% of a non-drying oil;
   about 10–70% of a hydrocarbon solvent substantially the entire amount of which has a kauri-butanol value within the range of about 20–50 and boils within the range of about 80–200° C.;
   about 0.05–3% of a cationic emulsifier which is soluble in said hydrocarbon solvent but insoluble and dispersible in water and has an HLB value of less than about 10;
   from 0 to about 5% of a nonionic emulsifier at least in an amount sufficient to stabilize the emulsion; and
   at least about 20% water, said hydrocarbon solvent, water, film-forming materials and cationic emulsifier being selected in an amount to provide both high gloss properties and good cleaning of oil-borne deposits.

2. A surface-treating composition of claim 1 wherein said cationic emulsifier is selected from the group consisting of the quaternary ammonium halides and the quaternary ammonium sulfates.

3. A surface-treating composition of claim 2 wherein said cationic emulsifier is a long chain difatty ethoxylated quaternized amidoamine of the formula

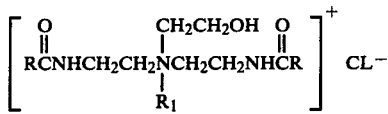

where R is a fatty residue derived from soya oil and $R_1$ is methyl.

4. A surface-treating composition of claim 1 having about 0.07 to 0.5% of said cationic emulsifier.

5. A surface-treating composition of claim 4 wherein said cationic emulsifier is selected from the group consisting of the quaternary ammonium halides and the quaternary ammonium sulfates.

6. A surface-treating composition of claim 5 wherein said cationic emulsifier is a long chain difatty ethoxylated quaternized amidoamine of the formula

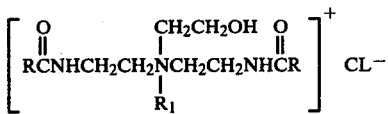

where R is a fatty residue derived from soya oil and $R_1$ is methyl.

7. A surface-treating composition of claim 1 having about 0.01 to 5% of said nonionic emulsifier.

8. A surface-treating composition of claim 4 having about 0.01 to 5% of said nonionic emulsifier.

9. A surface-treating composition of claim 1 having about 20 to 50% of said isoparaffinic hydrocarbon solvent.

10. A surface-treating composition of claim 9 having about 25 to 35% of said isoparaffinic hydrocarbon solvent.

11. A surface-treating composition of claim 10 wherein said cationic emulsifier is selected from the group consisting of the quaternary ammonium halides and the quaternary ammonium sulfates.

12. A surface-treating composition of claim 11 wherein said cationic emulsifier is a long chain difatty ethoxylated quaternized amidoamine of the formula

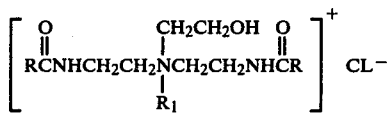

where R is a fatty residue derived from soya oil and $R_1$ is methyl.

13. A surface-treating composition of claim 1 wherein said film-forming organic polysiloxane is selected from the group consisting of polydialkyl siloxanes and polyalkyl aryl siloxanes and mixtures thereof.

14. A surface-treating composition of claim 13 wherein said film-forming organic polysiloxane is dimethyl polysiloxane.

15. A surface-treating composition of claim 1 wherein said cationic emulsifier has an HLB value of about 8.5.

16. A surface-treating composition of claim 15 wherein said cationic emulsifier is a long chain difatty ethoxylated quaternized amidoamine of the formula

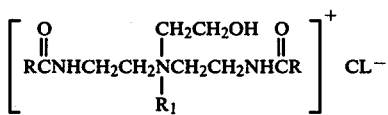

where R is a fatty residue derived from soya oil and $R_1$ is methyl.

* * * * *

UNITED STATES PATENT OFFICE
CERTIFICATE OF CORRECTION

Patent No. 4,163,673          Dated August 7, 1979

Inventor(s) Roberta S. Dechert

It is certified that error appears in the above-identified patent and that said Letters Patent are hereby corrected as shown below:

Column 4, line 29 - Delete "0.5" and insert "0.05".

Column 6, line 64 - Delete "11°" and insert "116°".

Signed and Sealed this

Thirteenth Day of November 1979

[SEAL]

Attest:

RUTH C. MASON
Attesting Officer

LUTRELLE F. PARKER
Acting Commissioner of Patents and Trademarks